United States Patent
Baier et al.

(10) Patent No.: US 8,805,760 B2
(45) Date of Patent: *Aug. 12, 2014

(54) HISTORIANS EMBEDDED IN INDUSTRIAL UNITS

(75) Inventors: John J. Baier, Mentor, OH (US); Taryl J. Jasper, South Euclid, OH (US); John T. Campbell, Bridgeville, PA (US); Robert J. McGreevy, Oswego, IL (US); Frank Anthony Palmieri, Jr., Gibsonia, PA (US); Robert J. Herbst, Aurora, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/089,152

(22) Filed: Apr. 18, 2011

(65) Prior Publication Data

US 2011/0196528 A1 Aug. 11, 2011

Related U.S. Application Data

(63) Continuation of application No. 11/862,180, filed on Sep. 26, 2007, now Pat. No. 7,930,261.

(51) Int. Cl.
*G06N 5/00* (2006.01)
(52) U.S. Cl.
USPC .............................. 706/45; 719/328; 707/779
(58) Field of Classification Search
USPC .......................................................... 706/45
See application file for complete search history.

(56) References Cited

U.S. PATENT DOCUMENTS

| | | |
|---|---|---|
| 4,510,565 A | 4/1985 | Dummermuth |
| 4,553,205 A | 11/1985 | Porchia |
| 4,616,333 A | 10/1986 | Shimoni |
| 4,718,025 A | 1/1988 | Minor et al. |
| 4,731,735 A | 3/1988 | Borgendale et al. |
| 4,750,116 A | 6/1988 | Pham et al. |
| 4,773,028 A | 9/1988 | Tallman |
| 4,831,529 A | 5/1989 | Miike et al. |
| 4,975,865 A | 12/1990 | Carrette et al. |
| 5,003,469 A | 3/1991 | Kamiyama et al. |

(Continued)

FOREIGN PATENT DOCUMENTS

| | | |
|---|---|---|
| EP | 0490864 | 6/1992 |
| EP | 1109107 | 6/2001 |

(Continued)

OTHER PUBLICATIONS

OA dated Oct. 19, 2011 for U.S. Appl. No. 12/783,229, 18 pages.

(Continued)

*Primary Examiner* — Jeffrey A Gaffin
*Assistant Examiner* — Kalpana Bharadwaj
(74) *Attorney, Agent, or Firm* — Amin, Turocy & Watson, LLP

(57) ABSTRACT

Systems and methods that provide a historian integrated as part of an industrial unit and/or product manufactured by the industrial process. A historian integrated as part of the industrial unit itself, can increase data resolution and supply immediate and real time data regarding the industrial unit's operation—while mitigating short comings of conventional PC historians. Moreover, a locator component can detect embedded historians that are distributed on the back plane of an industrial network, and integrated as part thereof.

20 Claims, 10 Drawing Sheets

(56) References Cited

U.S. PATENT DOCUMENTS

| | | |
|---|---|---|
| 5,051,932 A | 9/1991 | Inove et al. |
| 5,115,499 A | 5/1992 | Stiffler et al. |
| 5,274,781 A | 12/1993 | Gibart |
| 5,408,663 A | 4/1995 | Miller |
| 5,452,201 A | 9/1995 | Pieronek et al. |
| 5,568,383 A | 10/1996 | Johnson et al. |
| 5,611,059 A | 3/1997 | Benton et al. |
| 5,805,442 A | 9/1998 | Crater et al. |
| 5,812,394 A | 9/1998 | Lewis et al. |
| 5,870,309 A | 2/1999 | Lawman |
| 5,901,323 A | 5/1999 | Milliken et al. |
| 5,943,675 A | 8/1999 | Keith et al. |
| 5,950,006 A | 9/1999 | Crater et al. |
| 5,987,239 A | 11/1999 | Kirsch |
| 5,991,793 A | 11/1999 | Mukaida et al. |
| 6,092,036 A | 7/2000 | Hamann |
| 6,110,214 A | 8/2000 | Klimasauskas |
| 6,139,201 A | 10/2000 | Carbonell et al. |
| 6,198,480 B1 | 3/2001 | Cotugno et al. |
| 6,204,782 B1 | 3/2001 | Gonzalez et al. |
| 6,219,649 B1 | 4/2001 | Jameson |
| 6,233,623 B1 | 5/2001 | Jeffords et al. |
| 6,252,589 B1 | 6/2001 | Rettig et al. |
| 6,263,487 B1 | 7/2001 | Stripf et al. |
| 6,298,393 B1 | 10/2001 | Hopsecger |
| 6,298,454 B1 | 10/2001 | Schleiss et al. |
| 6,385,496 B1 | 5/2002 | Irwin et al. |
| 6,411,987 B1 | 6/2002 | Steger et al. |
| 6,487,455 B1 | 11/2002 | Balasubramanian |
| 6,505,247 B1 | 1/2003 | Steger et al. |
| 6,536,029 B1 | 3/2003 | Boggs et al. |
| 6,539,271 B2 | 3/2003 | Lech et al. |
| 6,559,861 B1 | 5/2003 | Kennelly et al. |
| 6,574,639 B2 | 6/2003 | Carey et al. |
| 6,578,005 B1 | 6/2003 | Lesaint et al. |
| 6,584,488 B1 | 6/2003 | Brenner et al. |
| 6,618,856 B2 | 9/2003 | Coburn et al. |
| 6,633,782 B1 | 10/2003 | Schleiss et al. |
| 6,687,257 B1 | 2/2004 | Balasubramanian |
| 6,701,324 B1 | 3/2004 | Nair et al. |
| 6,754,668 B2 | 6/2004 | Noble et al. |
| 6,754,885 B1 | 6/2004 | Dardinski et al. |
| 6,766,214 B1 | 7/2004 | Wang et al. |
| 6,795,798 B2 | 9/2004 | Eryurek et al. |
| 6,799,148 B2 | 9/2004 | Ling et al. |
| 6,847,850 B2 | 1/2005 | Grumelart |
| 6,847,854 B2 | 1/2005 | Discenzo |
| 6,865,644 B2 | 3/2005 | Husted et al. |
| 6,901,446 B2 | 5/2005 | Chellis et al. |
| 6,952,727 B1 | 10/2005 | Lindner et al. |
| 6,975,913 B2 | 12/2005 | Kreidler et al. |
| 6,976,247 B1 | 12/2005 | Altfeld |
| 7,043,311 B2 | 5/2006 | Nixon et al. |
| 7,050,873 B1 | 5/2006 | Discenzo |
| 7,069,201 B1 | 6/2006 | Lindner et al. |
| 7,152,222 B2 | 12/2006 | Kumhyr et al. |
| 7,181,370 B2 | 2/2007 | Furem et al. |
| 7,206,646 B2 | 4/2007 | Nixon et al. |
| 7,206,965 B2 | 4/2007 | Roddy et al. |
| 7,218,974 B2 | 5/2007 | Rumi et al. |
| 7,228,310 B2 | 6/2007 | O'Brien |
| 7,249,356 B1 | 7/2007 | Wilson et al. |
| 7,257,635 B2 | 8/2007 | Chellis et al. |
| 7,272,665 B2 | 9/2007 | Yamada et al. |
| 7,275,062 B2 | 9/2007 | Deitz et al. |
| 7,286,888 B2 | 10/2007 | Monette et al. |
| 7,299,367 B2 | 11/2007 | Hamm et al. |
| 7,328,078 B2 | 2/2008 | Sanford et al. |
| 7,359,930 B2 | 4/2008 | Jackson et al. |
| 7,406,453 B2 | 7/2008 | Mundie et al. |
| 7,546,577 B2 | 6/2009 | Do et al. |
| 7,568,184 B1 | 7/2009 | Roth |
| 7,574,417 B1 | 8/2009 | McGreevy et al. |
| 7,584,216 B2 | 9/2009 | Travieso et al. |
| 7,616,095 B2 | 11/2009 | Jones et al. |
| 7,620,885 B2 | 11/2009 | Moulckers et al. |
| 7,627,385 B2 | 12/2009 | McGreevy et al. |
| 7,672,740 B1 | 3/2010 | Baier et al. |
| 7,684,876 B2 | 3/2010 | Grgic |
| 7,693,585 B2 | 4/2010 | Kalan et al. |
| 7,742,833 B1 | 6/2010 | Herbst et al. |
| 7,853,555 B2 | 12/2010 | Peoples et al. |
| 2002/0019839 A1 | 2/2002 | Shiu |
| 2002/0026317 A1 | 2/2002 | Labrique et al. |
| 2002/0054055 A1 | 5/2002 | Sone |
| 2002/0069235 A1 | 6/2002 | Chen |
| 2002/0120744 A1 | 8/2002 | Chellis et al. |
| 2002/0133523 A1 | 9/2002 | Ambler et al. |
| 2002/0165699 A1* | 11/2002 | Ling et al. ............ 702/187 |
| 2002/0169907 A1 | 11/2002 | Candea et al. |
| 2002/0174263 A1 | 11/2002 | Codd et al. |
| 2002/0184601 A1 | 12/2002 | Fitzhenry et al. |
| 2002/0184610 A1 | 12/2002 | Chong et al. |
| 2003/0014130 A1* | 1/2003 | Grumelart ............ 700/28 |
| 2003/0041135 A1 | 2/2003 | Keyes et al. |
| 2003/0100958 A1 | 5/2003 | Cachat et al. |
| 2003/0101208 A1 | 5/2003 | Chauvel et al. |
| 2003/0130899 A1 | 7/2003 | Ferguson et al. |
| 2003/0172107 A1 | 9/2003 | Leyfer et al. |
| 2003/0182303 A1 | 9/2003 | Gibson |
| 2004/0153437 A1 | 8/2004 | Buchan |
| 2004/0181294 A1 | 9/2004 | Deitz et al. |
| 2004/0194061 A1 | 9/2004 | Fujino |
| 2004/0225649 A1 | 11/2004 | Yeo et al. |
| 2005/0071755 A1 | 3/2005 | Harrington et al. |
| 2005/0085928 A1 | 4/2005 | Shani |
| 2005/0086343 A1 | 4/2005 | Chellis et al. |
| 2005/0198034 A1 | 9/2005 | Boyer |
| 2005/0198406 A1 | 9/2005 | Sichner |
| 2005/0203648 A1 | 9/2005 | Martin |
| 2005/0210337 A1 | 9/2005 | Chester et al. |
| 2006/0004827 A1 | 1/2006 | Stuart |
| 2006/0020928 A1 | 1/2006 | Holloway et al. |
| 2006/0026559 A1 | 2/2006 | Gunturi et al. |
| 2006/0064486 A1 | 3/2006 | Baron et al. |
| 2006/0067334 A1 | 3/2006 | Ougarov et al. |
| 2006/0161268 A1 | 7/2006 | Frensch et al. |
| 2006/0218102 A1 | 9/2006 | Gibson et al. |
| 2006/0259160 A1 | 11/2006 | Hood et al. |
| 2006/0259499 A1 | 11/2006 | Moulckers et al. |
| 2006/0291261 A1 | 12/2006 | Jin et al. |
| 2006/0294502 A1 | 12/2006 | Das et al. |
| 2007/0006039 A1 | 1/2007 | Fichter et al. |
| 2007/0027913 A1 | 2/2007 | Jensen et al. |
| 2007/0028070 A1 | 2/2007 | Avergun et al. |
| 2007/0038610 A1 | 2/2007 | Omoigui |
| 2007/0050348 A1 | 3/2007 | Aharoni et al. |
| 2007/0073744 A1 | 3/2007 | McVeigh et al. |
| 2007/0112447 A1 | 5/2007 | McGreevy et al. |
| 2007/0112801 A1 | 5/2007 | McGreevy et al. |
| 2007/0136533 A1 | 6/2007 | Church et al. |
| 2007/0142941 A1 | 6/2007 | McGreevy et al. |
| 2007/0156770 A1 | 7/2007 | Espelien |
| 2007/0244964 A1 | 10/2007 | Challenger et al. |
| 2007/0245339 A1 | 10/2007 | Bauman et al. |
| 2007/0282577 A1 | 12/2007 | Lind |
| 2007/0288795 A1 | 12/2007 | Leung et al. |
| 2007/0294078 A1 | 12/2007 | Kim et al. |
| 2008/0027678 A1 | 1/2008 | Miller |
| 2008/0082577 A1 | 4/2008 | Hood et al. |
| 2008/0098356 A1 | 4/2008 | Ericsson et al. |
| 2008/0126408 A1 | 5/2008 | Middleton |
| 2008/0127091 A1 | 5/2008 | Ericsson et al. |
| 2008/0263518 A1 | 10/2008 | Bank et al. |
| 2008/0313228 A1 | 12/2008 | Clark et al. |
| 2010/0146491 A1 | 6/2010 | Hirano et al. |

FOREIGN PATENT DOCUMENTS

| | | |
|---|---|---|
| EP | 1307823 | 5/2003 |
| GB | 2347234 | 8/2000 |
| GB | 2353616 A1 | 2/2001 |

(56) References Cited

FOREIGN PATENT DOCUMENTS

| WO | 2004027531 A | 4/2004 |
|---|---|---|
| WO | 2005006130 A2 | 1/2005 |
| WO | 2005006130 A3 | 1/2005 |

OTHER PUBLICATIONS

Notice of Allowance mailed Aug. 5, 2011 for U.S. Appl. No. 12/691,302, 78 pages.
OA dated Aug. 5, 2011 for U.S. Appl. No. 11/864,634, 20 pages.
OA dated Sep. 30, 2011 for U.S. Appl. No. 11/537,144, 14 pages.
Notice of Allowance dated Jun. 13, 2010 for U.S. Appl. No. 11/862,891, 49 pages.
OA dated Jul. 8, 2010 for U.S. Appl. No. 11/558,710, 28 pages.
OA dated Jul. 23, 2010 for U.S. Appl. No. 11/536,550, 51 pages.
OA dated Aug. 23, 2010 for U.S. Appl. No. 11/558,705, 44 pages.
OA dated Sep. 17, 2010 for U.S. Appl. No. 11/864,634, 43 pages.
OA dated Oct. 14, 2010 for U.S. Appl. No. 11/862,861, 43 pages.
OA dated Sep. 3, 2010 for U.S. Appl. No. 11/750,193, 68 pages.
Notice of Allowance mailed Dec. 13, 2010 for U.S. Appl. No. 11/862,180, 74 pages.
OA dated Nov. 19, 2010 for U.S. Appl. No. 12/783,229, 41 pages.
European Search Report dated Oct. 22, 2010 for European Patent Application No. EP 08 16 5010, 10 pages.
OA dated Jan. 4, 2011 for U.S. Appl. No. 11/536,550, 44 pages.
Notice of Allowance mailed Nov. 9, 2010 for U.S. Appl. No. 11/537,110, 38 pages.
OA dated Mar. 22, 2011 for U.S. Appl. No. 12/783,229, 14 pages.
OA dated Mar. 21, 2011 for U.S. Appl. No. 12/691,302, 72 pages.
OA dated Mar. 31, 2011 for U.S. Appl. No. 11/537,144, 49 pages.
OA dated Mar. 3, 2011 for U.S. Appl. No. 11/864,634, 21 pages.
Oa dated Jun. 11, 2010 for U.S. Appl. No. 11/862,180, 27 pages.
European Search Report dated Mar. 10, 2010 for European Application Serial No. EP 08 16 4957, 7 pages.
"Proficy Historian"; Dec. 16, 2004, GE FANUC, pp. 1-8.
"Major Canadian Natural Gas Producer Buys AnyWhere/AnyTime Services from Industrial Evolution" Mar. 12, 2001, Industrial Evolution pp. 1.
Alvestrand. "Tags for the Identification of Languages: rfc 1766. txt," Internet Engineering Task Force, Mar. 1995, XP015007553, Issn: 0000-0003. ftp://ftp.isi.edu/in-notes/rfc1766.txt. Last accessed Jun. 6, 2008, 9 pages.
Cardoso, et al. Macro-Based Hardware Compilation of Java (TM) Bytecodes Into a Dynamic Reconfigurable Computing System, Apr. 21, 1999. In IEEE Seventh Symposium on Field Programmable Custom Computing Machines, (FCCM'99). Napa Valley, California, Apr. 21-23, 1999. http://citeseerx.ist.psu.edu/viewdoc/summary?doi=10.1.1.41.8292. Last accessed Jan. 21, 2008, 10 pages.
EP Office Action for Application No. 08165215.8-1243 dated Mar. 3, 2009, 2 pages.
European Search Report and Written Opinion for European Application No. EP 08 16 5215, dated Dec. 8, 2008, 6 pages.
European Search Report dated Jan. 20, 2009 for European Patent Application No. EP08156281, 6 Pages.
European Search Report dated Dec. 18, 2007 for European Patent Application Serial No. 07117364.5-2221, 2 Pages.
European Search Report dated Feb. 22, 2008 for European Patent Application Serial No. EP 07 11 7388, 1 Page.
European Search Report for European Patent Application No. EP07117614 dated Feb. 5, 2008, 8 pgs.
European Search Report for European Patent Application No. EP07117622 dated May 2, 2008, 3 pages.
Miller, et al. "Extending the Reach of Enterprise Data Management in a World of M2M." ISA Expo. Oct. 2005, pp. 1-7.
OA dated Jan. 26, 2009 for U.S. Appl. No. 11/536,535, 40 pages.
OA dated Apr. 3, 2009 for U.S. Appl. No. 11/536,522, 20 pages.
OA dated Apr. 22, 2009 for U.S. Appl. No. 11/558,705, 23 pages.
OA dated Jul. 10, 2009 for U.S. Appl. No. 11/536,545, 30 pages.
OA dated Jul. 21, 2008 for U.S. Appl. No. 11/536,522, 21 pages.
OA dated Jul. 23, 2008 for U.S. Appl. No. 11/536,535, 31 pages.

OA dated Jul. 28, 2008 for U.S. Appl. No. 11/536,545, 26 pages.
OA dated Jul. 29, 2009 for U.S. Appl. No. 11/558,710, 18 pages.
OA dated Sep. 16, 2009 for U.S. Appl. No. 11/558,705, 23 pages.
OA dated Oct. 13, 2009 for U.S. Appl. No. 11/536,522, 22 pages.
OA dated Nov. 14, 2008 for U.S. Appl. No. 11/558,710, 18 pages.
OA dated Dec. 3, 2008 for U.S. Appl. No. 11/536,566, 35 pages.
OA dated Dec. 12, 2008 for U.S. Appl. No. 11/536,545, 18 pages.
OA dated Dec. 18, 2008 for U.S. Appl. No. 11/536,522, 15 pages.
Power Rich System, Enterprise Edition, Historian (PRS EE Historian) Version 1.5, last accessed Dec. 3, 2008, 15 pages.
Real Time Intelligence at the Source-Deploying and Embedded Historian. Users Conference 2005, pp. 1.
Sakharov. Macro-Processing in High-Level Languages. ACM SIGPLAN Notices, vol. 27, No. 11, Nov. 1, 1992, pp. 59-66, XP000328425, ISSN: 0362-1340. Last accessed Jan. 20, 2009, 18 pages.
Wonderware Plant Intelligence Solution Helps Arla Foods Deliver Fresh Milk Products to the Tables of Europe. Last accessed Dec. 3, 2008, 4 pages.
OA dated Jan. 4, 2010 for U.S. Appl. No. 11/558,710, 37 pages.
CNOA Due Dec. 29, 2008 for Chinese Patent Application No. 200710162327.9, 6 pages.
OA dated Mar. 30, 2010 for U.S. Appl. No. 11/558,705, 44 pages.
European Search Report dated Mar. 25, 2010 for European Patent Application No. EP 07 12 0362, 6 pages.
"High Level Triggers, Data Acquisition and Controls." ATLAS Technical Design Report, Jun. 30, 2003, pp. 1-370, XP002570453, Chapters 1-7, 9, 11, 13. http://cdsweb.cern.ch/record/616089/files/cer-002375189.pdf. Last accessed Apr. 1, 2010, 196 pages.
Vermeulen, et al. "ATLAS Dataflow: the Read-Out Subsystem, Results from Trigger and Data Acquisition System Testbed Studies and from Modeling." 14th IEEE—NPSS Real time Conference, Stockholm, Sweden, Jun. 4-10, 2005, pp. 270-274, XP010859081, ISBN: 978-0-7803-9183-3.
Gameiro, et al. "The ROD Crate DAQ of the ATLAS Data Acquisition System." 14th IEEE—NPSS Real time Conference, Stockholm, Sweden, Jun. 4-10, 2005, pp. 527-531, XP010859117, ISBN: 978-0-7803-9183-3.
European Search Report dated Mar. 25, 2010 for European Patent Application No. EP 07 12 0357, 5 pages.
OA dated Mar. 24, 2010 for U.S. Appl. No. 11/750,193, 36 pages.
Charbonnier, et al. "Trends Extraction and Analysis for Complex System Monitoring and Decision Support." Feb. 1, 2005, Engineering Applications of Artificial Intelligence, Pineridge Press, Swansea, GB, pp. 21-36, XP025299588, ISSN: 0952-1976.
Uraikul, et al. "Artificial Intelligence for Monitoring and Supervisory Control of Process Systems." Nov. 30, 2006, Engineering Applications of Artificial Intelligence, Pineridge Press, Swansea, GB, pp. 115-131, XP005786108, ISSN: 0957-1976.
OA dated Apr. 1, 2010 for U.S. Appl. No. 11/863,216, 28 pages.
OA dated Jun. 25, 2010 for U.S. Appl. No. 11/862,182, 41 pages.
OA dated Jul. 22, 2010 for U.S. Appl. No. 11/862,183, 39 pages.
OA dated May 27, 2010 for U.S. Appl. No. 11/537,110, 77 pages.
A new general purpose compression method for searching in large collection, Bhadade, U.S.; Sharma, V.K.; Trivedi, A.I.; TENCON 2007—2007 IEEE Region 10 Conference Digital Object Identifier: 10.11 09ITENCON.2007.4428935. Publication Year: 2007, pp. 1-4.
Input Data Representation for Self-Organizing Map in Software Classification, Yuqing Lin; Huilin Ye; Knowledge Acquisition and Modeling, 2009. KAM '09. Second International Symposium on vol. 2 Digital Object Identifier: 10.11 09/KAM2009.151, Publication Year: 2009, pp. 350-353.
Supervised and Traditional Term Weighting Methods for Automatic Text Categorization, Man Lan; Chew Lim Tan; Jian Su; Yue Lu; Pattern Analysis and Machine Intelligence, IEEE Transactions on vol. 31, Issue: 4. Digital Object Identifier: 10.11 091TPAMI2008.11 0 Publication Year: 2009, pp. 721-735.
Selecting predicate logic for knowledge representation by comparative study of knowledge representation schemes, Ali, A.; Khan, M.A.; Emerging Technologies, 2009. ICET 2009. International Conference on Digital Object Identifier: 10.11 09/ICET2009.5353207 Publication Year: 2009, pp. 23-28.
OA dated Apr. 2, 2012 for U.S. Appl. No. 11/536,550, 63 pages.

(56) References Cited

OTHER PUBLICATIONS

OA dated Jan. 4, 2012 for U.S. Appl. No. 11/864,634, 20 pages.
OA dated Apr. 11, 2013 for U.S. Appl. No. 11/536,550, 55 pages.
OA dated Oct. 12, 2012 for U.S. Appl. No. 11/536,550, 45 pages.
Office Action dated Aug. 15, 2013 for U.S. Appl. No. 11/536,550, 55 pages.

* cited by examiner

HISTORIANS EMBEDDED IN INDUSTRIAL UNITS

RELATED APPLICATIONS

This application is a Continuation of U.S. patent application Ser. No. 11/862,180, filed Sep. 26, 2007 and entitled "HISTORIANS EMBEDDED IN INDUSTRIAL UNITS", the entirety of which is incorporated herein by reference.

TECHNICAL FIELD

The subject invention relates generally to historian components associated with industrial controllers and more particularly to embedding and/or integrating a historian as part of an industrial unit and/or as part of a device that is manufactured by an industrial process.

BACKGROUND

Industrial controllers are special-purpose computers utilized for controlling industrial processes, manufacturing equipment, and other factory automation, such as data collection or networked systems. At the core of the industrial control system, is a logic processor such as a Programmable Logic Controller (PLC) or PC-based controller. Programmable Logic Controllers for instance, are programmed by systems designers to operate manufacturing processes via user-designed logic programs or user programs. The user programs are stored in memory and generally executed by the PLC in a sequential manner although instruction jumping, looping and interrupt routines, for example, are also common. Associated with the user program are a plurality of memory elements or variables that provide dynamics to PLC operations and programs Differences in PLCs are typically dependent on the number of Input/Output (I/O) they can process, amount of memory, number and type of instructions, and speed of the PLC central processing unit (CPU).

In a more macro sense than the controller, businesses have become more complex in that higher order business systems or computers often need to exchange data with such controllers. For instance, an industrial automation enterprise may include several plants in different locations. Modern drivers such as efficiency and productivity improvement, and cost-reduction, are requiring manufacturers to collect, analyze, and optimize data and metrics from global manufacturing sites. For example, a food company can have several plants located across the globe for producing a certain brand of food. These factories in the past were standalone, with minimum data collection and comparison of metrics with other similar factories. In the networked world of today, manufacturers are demanding real-time data from their factories to drive optimization and productivity. Unfortunately, conventional control systems architectures are not equipped to allow a seamless exchange of data between these various components of the enterprise.

Another requirement of modern control system architectures is the ability to record and store data in order to maintain compliance with Food and Drug Administration regulations such as Regulation 21 CFR Part 11. One common solution for recording data includes providing a local recording module that often occupies a slot in a controller backplane such as a PC-Historian which is an industrial computer for the controller backplane, and employs a transitional layer to supply an indirect interface to the controller. This includes a platform that provides high speed, time series, data storage and retrieval with both local and remote control processors. The PC-Historian communicates with controllers directly through the backplane and can communicate remotely via a network interface. The PC-Historian allows archiving data from the controller to an Archive Engine which provides additional storage capabilities.

In general, conventional historian processors enable high-speed real-time data collection by communicating directly with the control processor across the backplane for fast data collection speeds. This includes handling large quantities of data over extended time periods while providing efficient storage and retrieval of process data over extended periods of time. These solutions are generally employed for electronic documentation and provide an audit trail and data flags for tracking modified, inserted, or incomplete data. In order to configure such products, a Graphical User Interface (GUI) can be provided to map controller tags defined in a local or remote processor to a data historian file.

There are several disadvantages to existing data collection and storage solutions however. Conventional PC-historians are generally applied on the back-end of system design and are thus loosely coupled or integrated within the framework of the control architecture. Such an arrangement leads to much inefficiency for collecting data and ultimately identifying what data should or should not be captured. Other shortcomings include issues related to which historians should collect what data, and how such micro historians map and integrate into a larger enterprise.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

The subject innovation provides for a historian(s) integrated as part of the industrial unit itself, to increase data resolution and supply immediate and real time data regarding the industrial unit's operation—while mitigating short comings of conventional PC historians. For example, for an industrial unit associated with food processing, such integrated historian can poll, record and process data with very high resolution (e.g., 1 millisecond), wherein processing occurs within the architecture—as opposed to a network connection. Moreover, a locator component can further detect embedded historians that are distributed on the back plane of an associated industrial network.

The acquired data can be maintained within the integrated historian for a predetermined time period. Accordingly, short comings associated with conventional PC historians, such as network connectivity issues, failures of operating system, power failures, and the like can be mitigated. The integrated historian of the subject innovation can further facilitate design of systems to provide common visualization to third party applications. Moreover, the subject innovation enables integration of additional elements, such as alarm event data, direct integration with other applications (e.g., batch) into the system, while presenting a common visualization to multiple third party applications. In a related aspect, the historian can be integrated as part of the manufactured product (e.g., historian embedded into a manufactured automobile that leaves the assembly line), to preserve data related to its manufacturing process within the product itself.

According to a methodology in accordance with an aspect of the subject innovation, type of data to be collected with relation to a manufactured product can be identified. The locator component can then be notified for locating historians that collect such data type. Subsequently, the data can be acquired, and aggregated into a historian that is embedded in to the product itself when it leaves the manufacturing line. Such historian integrated into the product can then be accessed to identify data related to the manufacturing process (e.g., name of manufacturing crew, environmental data existing at time of manufacture, and the like).

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
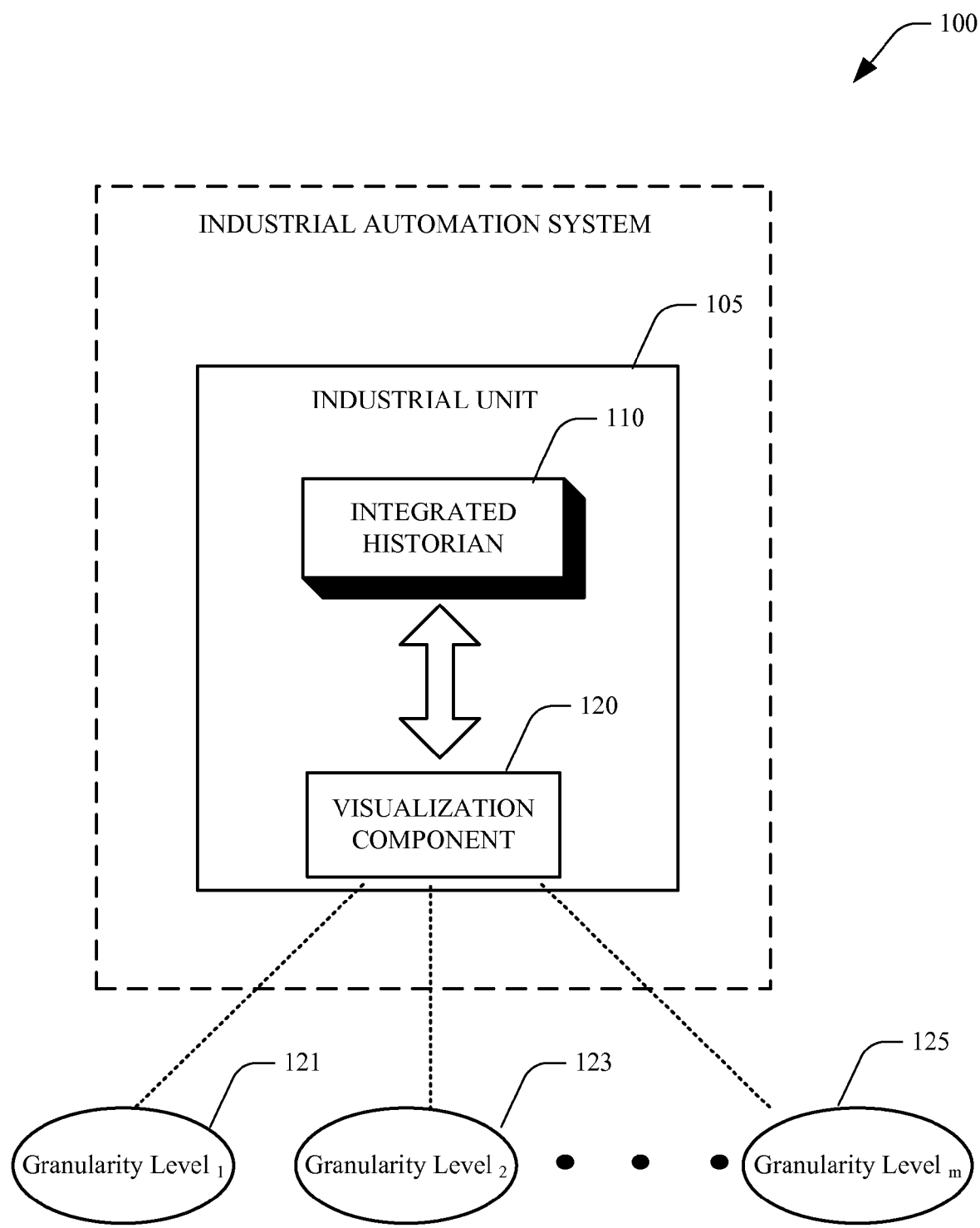
FIG. 1 illustrates a historian(s) that is integrated as part of the industrial unit itself, to increase data resolution and supply immediate and real time data regarding the industrial unit's operation.

FIG. 1 illustrates a historian(s) 110 that is integrated as part of the industrial unit 105 itself, to increase data resolution and supply immediate and real time data regarding the industrial unit's operation—while mitigating short comings of conventional PC historians. For example, for an industrial unit associated with food processing, such integrated historian can poll, record and process data with very high resolution (e.g., 1 millisecond), wherein processing occurs within the architecture—as opposed to a network connection. Such can facilitate compliance with Food and Drug Administration regulations, for example (e.g., Regulation 21 CFR Part 11.) Moreover, a locator component (not shown) can further detect embedded historians that are distributed on the back plane of an industrial network.

The integrated historian 110 can further be associated with a visualization component 120 that can display data collected by the integrated historian 110. The information displayed by the visualization component 120 can be related to specific processes, machines and/or data associated with various aspects of machine control, for example. Such information can also be modified with respect to various properties related to visual format and display of the information to a user. The visualization component 120 can change visual properties associated with received information based on various parameters. For example, display properties such as color, font, size, location, and/or various levels of detail and illustrated utilizing graphics such as bar graphs, dials, pie charts, and the like. Various external visual aids can also be associated with the data and displayed in place of or along side the data to provide context for the information, such as bitmaps, vector based graphics, and the like. The visualization component 120 can display data at various granularity levels 121, 123, 125 (1 to m—where m is an integer), wherein such granularity levels can be selected partially in response to fault detection, alert triggering, and the like. Such display enables a user (e.g., plant engineer, industrial operator) to view a rate of data collection and/or sampling throughout an industrial process, based on criticality of the operation for a trouble shooting thereof.

Figure 2:
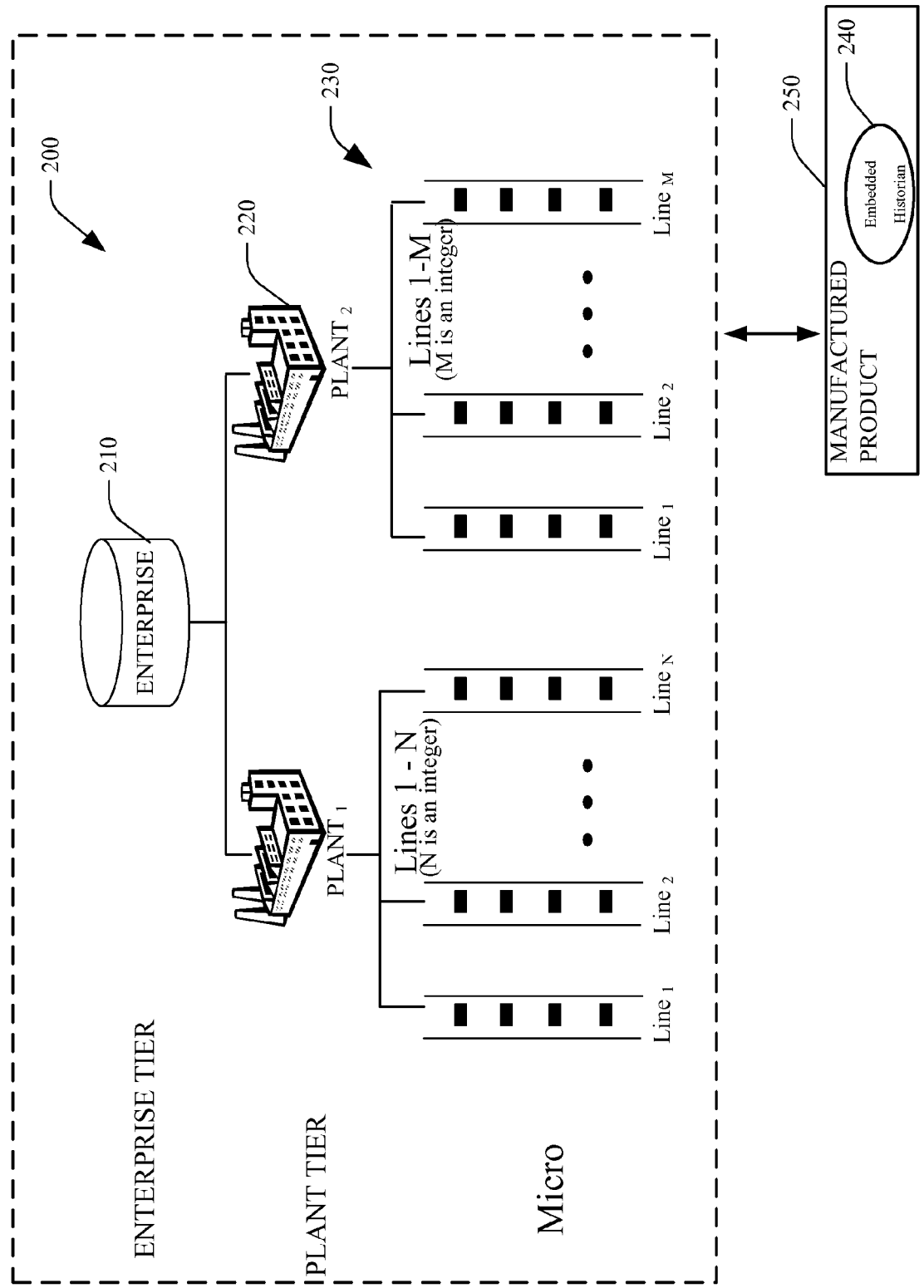
FIG. 2 illustrates a further aspect of the subject innovation wherein a historian can be integrated as part of the manufactured product, to preserve data related to manufacturing process within the product itself, in accordance with an aspect of the subject innovation.

FIG. 2 illustrates a further aspect of the subject innovation wherein a historian can be integrated as part of the manufactured product (e.g., as part of an manufactured automobile), to preserve data related to manufacturing process with the product itself. The manufactured product 250 can be any type of product that is created as a result of an industrial process such as: engines, electronics, mechanical equipment, consumer goods, home appliances, and the like. As such, data related to the industrial process that created the manufactured product 250 (e.g., temperature data, name of operator at time of creation, process employed, and the like) can be stored within the manufactured product itself for future reference. For example, the embedded historian 240 can be in form of an electronic chip that is embedded into an engine of an automobile and identifies data related to the fabrication process of the engine. Accordingly, subsequent trouble shooting attempts for such automobile can further be correlated to the manufacturing process data that is stored within the historian embedded in the engine, for example.

As illustrated in FIG. 2, multi-tiered and distributed historian system 200 can further be implemented in accordance with an aspect of the subject innovation. The exemplary system 200 illustrates three tiered historian level, wherein the highest data collection tier is illustrated and can be referred to as the enterprise tier 210. This tier aggregates data collected from lower level tiers such as from a plant tier 220 and a micro or embedded tier 230. As illustrated, the tiers 210 and 220 can include archival or permanent storage capabilities. In the system 200, data can be collected from two plants at the tier 220, and from a plurality of historian components at tier 230. It is to be appreciated that such an arrangement is exemplary in nature, and other arrangements are well within the realm of the subject innovation.

Typically, the system 200 can be viewed as a Distributed Historian that spans machines, plants, and enterprises. At level 230, the historian collects data at the rack level and is coupled to Common Plant Data Structure described above. Such can include collecting process & discrete data, alarms & events in a single archive if desired. Other aspects can include auto-discovery of data and context from controllers in local chassis including store/forward data capabilities from local buffers. Data can be collected without polling, having a low communications bandwidth. The plant level 220 aggregates data from micro or rack-embedded historians and/or other data sources (e.g., Live Data source). Such can include plant-level querying, analytics, reporting while efficiently storing, retrieving, and managing large amounts of data. This level can also auto-discover data and data model context from micro historians located at level 230. Other features of the system 200 can include analysis components, logical units, components for interaction with report elements, embeddable presentation components, replication of configuration, storage, archiving, data compression, summarization/filtering, security, and scalability.

Figure 3:
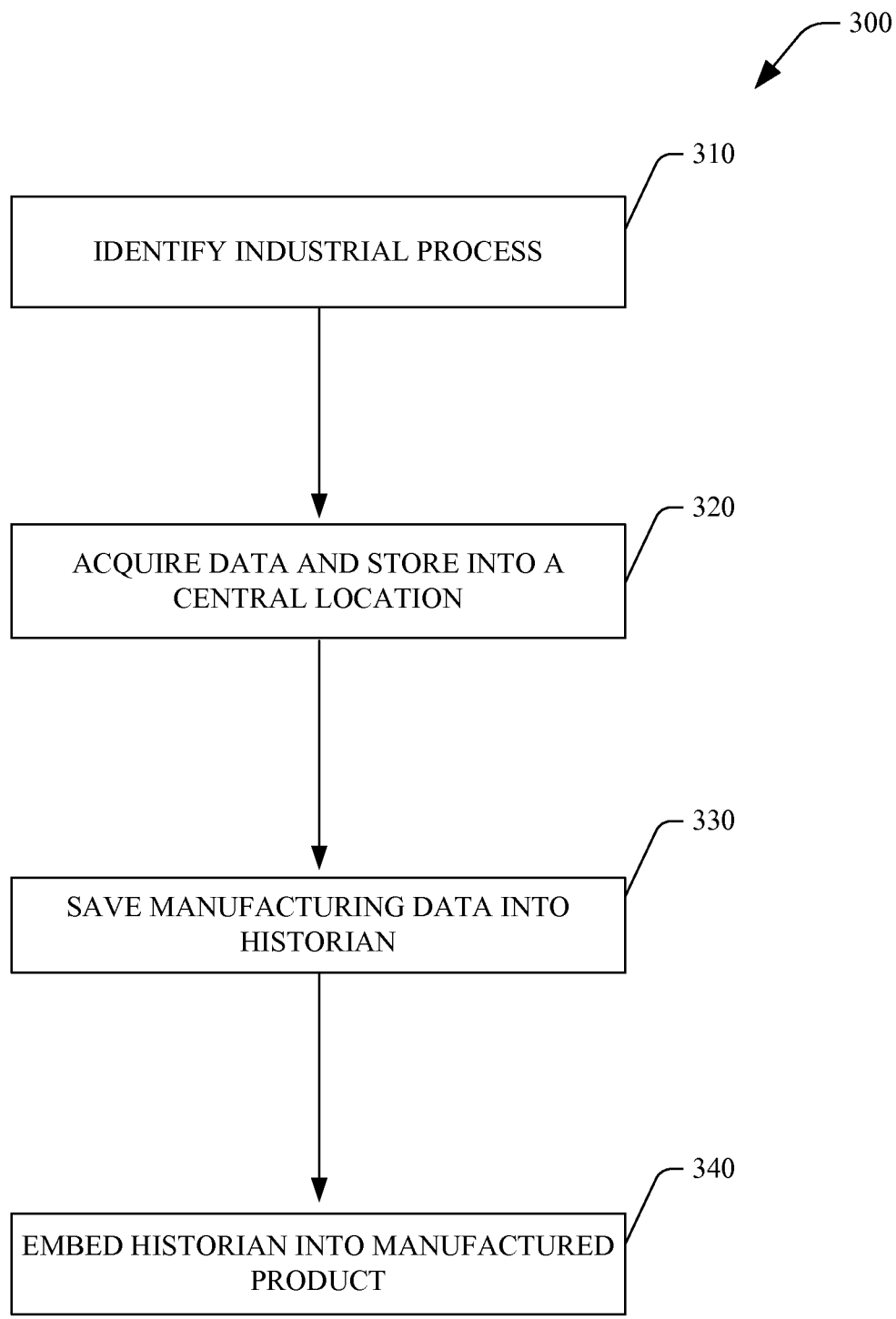
FIG. 3 illustrates a related methodology of embedding historian data related to a manufactured product, within the product itself in accordance with an aspect of the subject innovation.

FIG. 3 illustrates a related methodology 300 of embedding historian data related to a manufactured product, within the product itself in accordance with an aspect of the subject innovation. While the exemplary method is illustrated and described herein as a series of blocks representative of various events and/or acts, the present invention is not limited by the illustrated ordering of such blocks. For instance, some acts or events may occur in different orders and/or concurrently with other acts or events, apart from the ordering illustrated herein, in accordance with the invention. In addition, not all illustrated blocks, events or acts, may be required to implement a methodology in accordance with the present invention. Moreover, it will be appreciated that the exemplary method and other methods according to the invention may be implemented in association with the method illustrated and described herein, as well as in association with other systems and apparatus not illustrated or described. Initially and at 310 an industrial operation related to a manufactured product for which data collection is required can be identified. Subsequently, and at 320 data from a plurality of historians that operate as part of the industrial operation can be stored into a central location. From such pool of data and at 330, data related to a product can be designated and saved as part of a historian that is embedded into the product itself at 340. Accordingly, future trouble shooting efforts with respect to the product can employ data related to its manufacturing process (e.g., conditions of the manufacturing line, manufacturing crew involved, process methodologies employed therein, and the like.)

Figure 4:
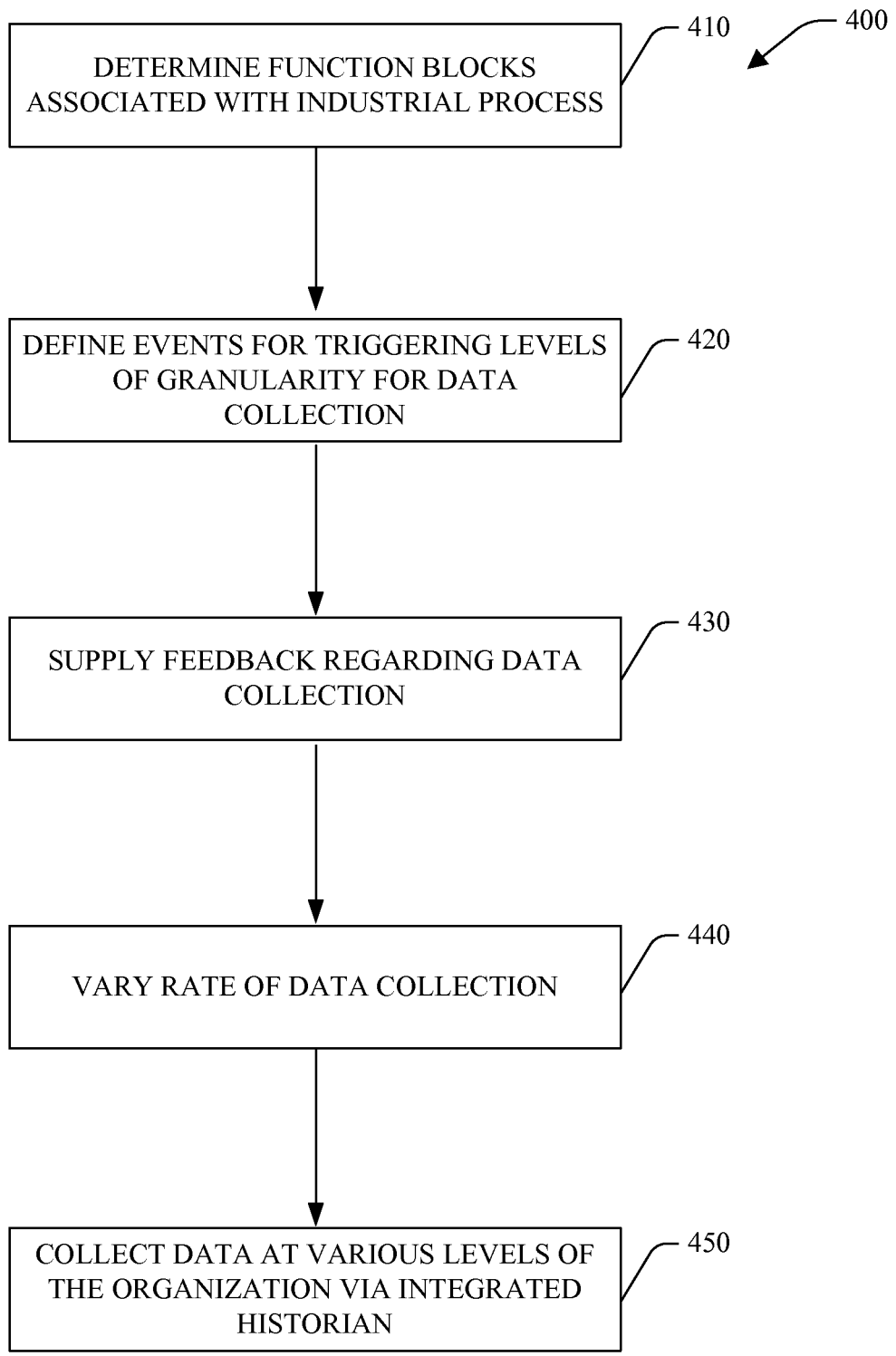
FIG. 4 illustrates a further methodology of embedding a historian as part of an industrial unit in accordance with an aspect of the subject innovation.

FIG. 4 illustrates a further methodology 400 of embedding a historian as part of an industrial unit in accordance with an aspect of the subject innovation. Initially, and at 410 various function blocks that are associated with an industrial process can be determined In general, such function blocks can pertain to a control strategy, which can be downloaded to one or more control modules in the control system. Moreover, the control functions represented by the function blocks are implemented in the verified control routine according to execution ordering which may be determined in the compilation or verification process in the configuration tool.

A plurality of triggering events can subsequently be defined at 420 that correspond to execution of a particular granularity of data collection associated with such function blocks. For example, such triggering event can be based on an execution order, data importance, likelihood of use, and the like. Next, and at 430 feedback can be provided (e.g., a plant engineer, operator) regarding efficiency of such data collection. Based on such feedback, and/or based on predetermined criteria (e.g., data criticality for future trouble shooting) a rate for data collection can be varied, at 440. Subsequently, and at 450, data collection can proceed from historians that are embedded and/or integrated in the industrial unit itself. Such integration can increase data resolution and supply immediate and real time data regarding the industrial unit's operation—while mitigating short comings of conventional PC historians.

Figure 5:
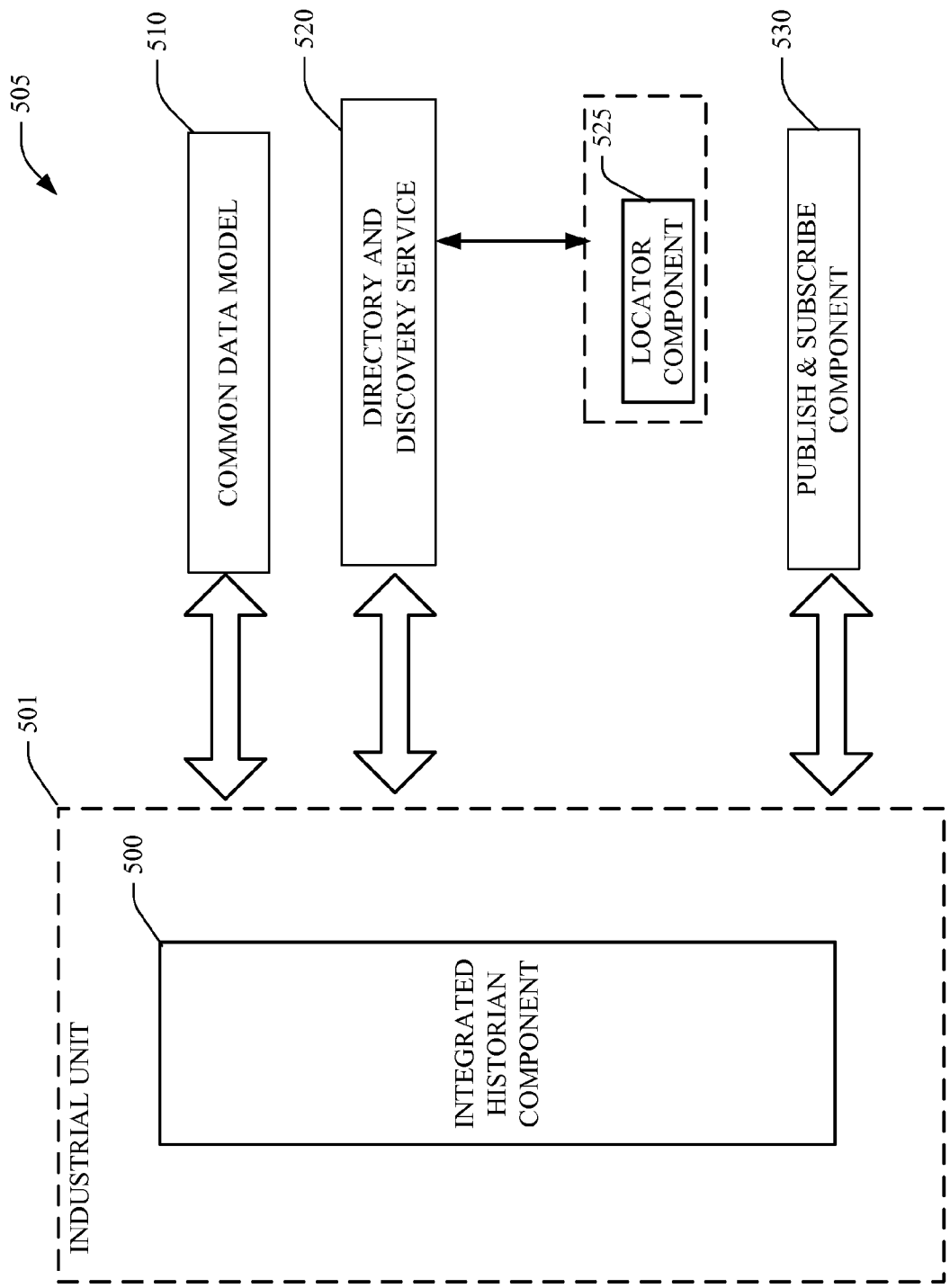
FIG. 5 illustrates an integrated historian component as part of an industrial unit in accordance with an aspect of the subject innovation.

FIG. 5 illustrates an integrated historian component 500 as part of an industrial unit 501 in accordance with an aspect of the subject innovation. The industrial setting 505 can employ a hierarchical data model with various level; e.g., enterprise level, site level (factory represented within a data packet), area level (an area within the factory associated with the data); line level (a line associated with particular data), a work-cell level (which indicates a work-cell associated with the data) and the like. For example by employing a nested, hierarchical data model, the integrated historian component 500 can readily become aware of data associated therewith. In addition, such hierarchy can further be customized by users to obtain increased granularity within the hierarchy. The common data model 510 can enable the integrated historian component 500 to determine data contexts in an automated manner. The common data model 510 allows data to be marked or labeled via metadata for example to both expose historian functionality to a system and/or to allow the embedded historian component 500 to be automatically integrated within the system according to data that is exposed to the embedded historian component. For example, one such labeling can pertain to security, and typically can affect substantially all components in the system associated with the common data model 510.

The locator component 525 can be associated with a directory and discovery service 520. Such an arrangement enables the integrated historian component 500 to locate other embedded historian components in the system and to receive/expose historian data to other system components. This can include a network directory that determines physical addresses from logical names and vice versa, for example. Moreover, the publish and subscribe component 530 can provide subscription functionality to the integrated historian component 500, wherein data collection efficiency of the system can be enhanced. For example, the publish and subscribe component 530 of the system 505 allows data to be published or generated when a change in the data has been detected. Thus, the integrated historian component 500 can subscribe to such change events and thus only record data when a change has occurred which reduces the amount of data to be stored. Furthermore, the locator component 525 can employ a trail of metadata to identify the embedded historians (e.g., micro-historians) and relevant historian data for collection. Additionally, a polling/publication arrangement can also be employed wherein the embedded historians (e.g., micro-historians) identify themselves to the locator component upon occurrence of a predetermined event, and/or periodically.

Figure 6:
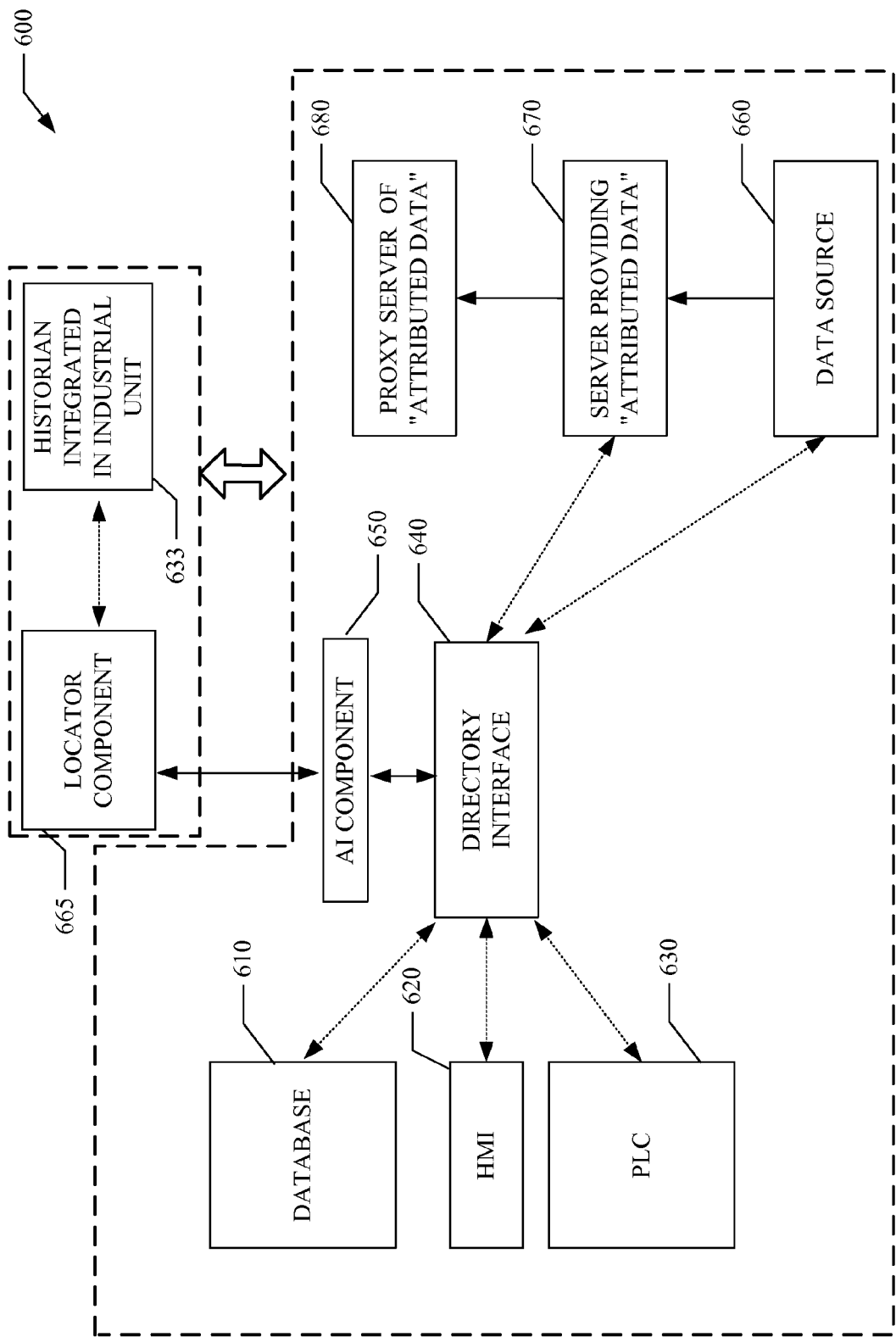
FIG. 6 illustrates an exemplary industrial automation network that employs a historian component that is integrated as part of an industrial unit, to enable high speed data collection (e.g., real time) from the industrial setting.

FIG. 6 illustrates an exemplary industrial automation network that employs a historian component that is integrated as part of an industrial unit 633, to enable high speed data collection (e.g., real time) from the industrial setting 600. The industrial setting 600 can include a database 610, a human machine interface (HMI) 620 and a programmable logic controller (PLC) 630, and a directory interface 640. The directory interface 640 can further associate with an Artificial Intelligence (AI) component 650 to facilitate efficient identification of historians integrated within an industrial unit thru a locator component 665. For example, in connection with distributing resources and/or identifying requirements of an embedded historian, the subject invention can employ various artificial intelligence schemes. A process for learning explicitly or implicitly how a resource should be distributed to an embedded historian, can be facilitated via an automatic classification system and process. Classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information) so that the classifier is used to automatically determine according to a predetermined criteria which answer to return to a question. For example, with respect to SVM's that are well understood, SVM's are configured via a learning or training phase within a classifier constructor and feature selection module. A classifier is a function that maps an input attribute vector, x=(x1, x2, x3, x4, xn), to a confidence that the input belongs to a class—that is, f(x)=confidence(class). As shown in FIG. 6, an artificial intelligence (AI) component 650 can be employed to facilitate inferring and/or determining when, where, how to allocate a plurality of available resources to the plurality of embedded historians. The AI component 650 can employ any of a variety of suitable AI-based schemes as described supra in connection with facilitating various aspects of the subject invention.

Moreover, the directory interface 640 can be employed to provide data from an appropriate location such as the data source 660, a server 670 and/or a proxy server 680. Accordingly, the directory interface 640 can point to a source of data based upon role and requirements (needs) of a requester (e.g., database 610, HMI 620, PLC 630, and the like.) The database 610 can be any number of various types such as a relational, network, flat-file or hierarchical systems. Typically, such databases can be employed in connection with various enterprise resource planning (ERP) applications that can service any number of various business related processes within a company. For example, ERP applications can be related to human resources, budgeting, forecasting, purchasing and the like. Accordingly, particular ERP applications can require data that has certain desired attributes associated therewith. Thus, in accordance with an aspect of the subject invention, the directory interface 640 can provide data to the database 610 from the server 670, which provides data with the attributes desired by the database 610.

As illustrated in FIG. 6, the embedded historian 633 can leverage directory interface 640 and other re-locatable information services or software services to facilitate allocation/distribution of resources among a plurality of plant embedded historians, via the allocation component 665. Moreover, the HMI 620 can employ the directory interface 640 to point to data located within the system 600. The HMI 620 can be employed to graphically display various aspects of a process, system, factory, etc. to provide a simplistic and/or user-friendly view of the system. Accordingly, various data points within a system can be displayed as graphical (e.g., bitmaps, jpegs, vector based graphics, clip art and the like) representations with desired color schemes, animation, and layout.

The HMI 620 can request data to have particular visualization attributes associated with data in order to easily display such data thereto. For example, the HMI 620 can query the directory interface 640 for a particular data point that has associated visualization attributes. The directory interface 640 can determine that the proxy server 680 contains the attributed data point with the desired visualization attributes. For instance, the attributed data point can have a particular graphic that is either referenced or sent along with the data such that this graphic appears within the HMI environment instead of or along with the data value.

The PLC 630 can be any number of models such as Allen Bradley PLC5, SLC-500, MicoLogix, and the like. The PLC 630 is generally defined as a specialized device employed to provide high-speed, low-level control of a process and/or system. The PLC 630 can be programmed using ladder logic or some form of structured language. Typically, the PLC 630 can utilize data directly from a data source (e.g., data source 660) that can be a sensor, encoder, measurement sensor, switch, valve and the like. The data source 660 can provide data to a register in a PLC, and such data can be stored in the PLC if desired. Additionally, data can be updated (e.g., based on a clock cycle) and/or output to other devices for further processing.

Figure 7:
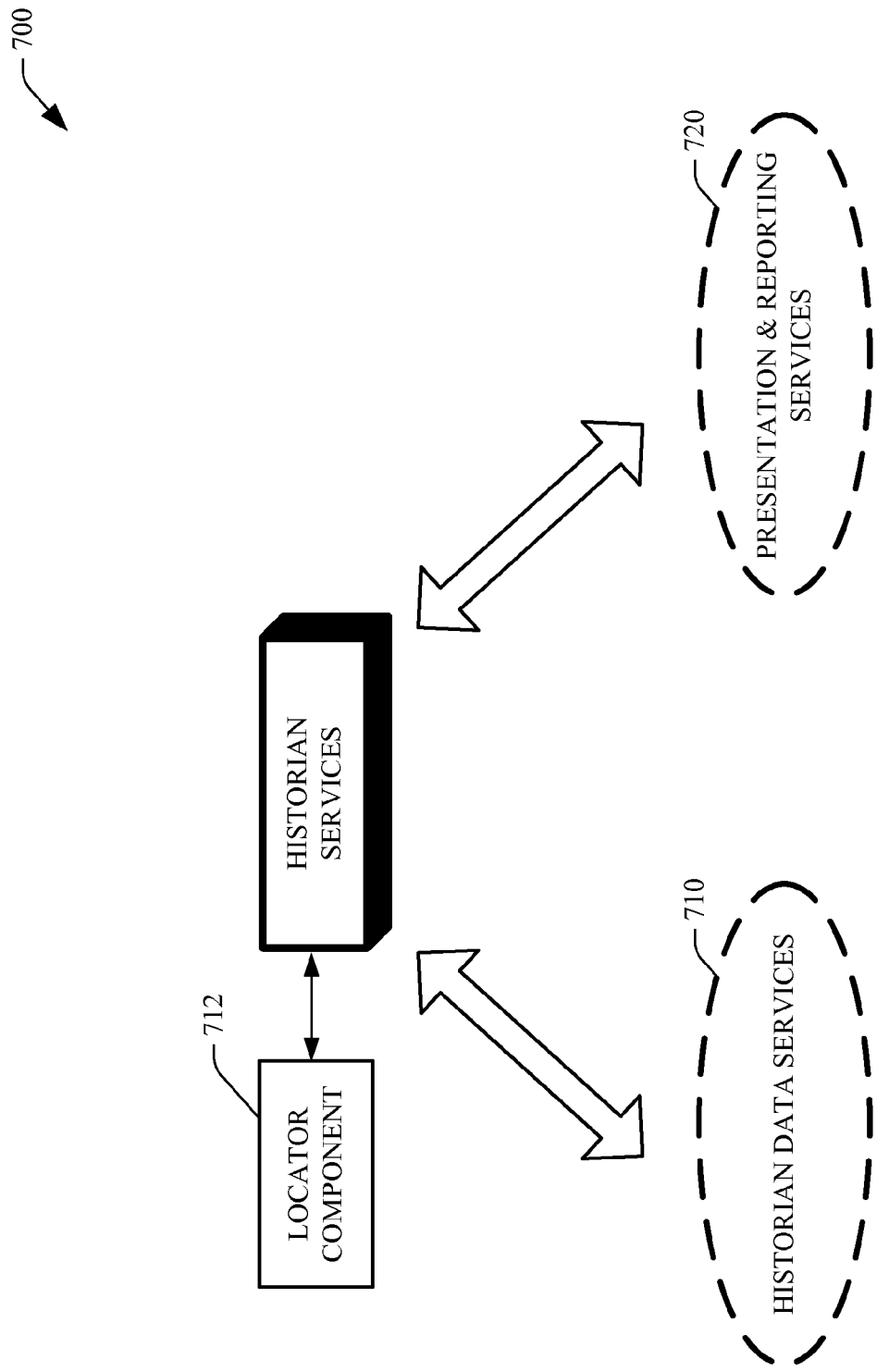
FIG. 7 illustrates historian services, which can employ a locator component for identifying a historian that is integrated as part of an industrial unit in accordance with an aspect of the subject innovation.

FIG. 7 illustrates historian services 700, which can employ a locator component 712 for identifying a historian that is integrated as part of an industrial unit in accordance with an aspect of the subject invention. The historian services 700 can include historian data services 710 and presentation and reporting services 720. Historian Data Services 710 (HDS) can supply generic, customizable services for collecting and storing data with plant model-defined context. This can include configuration of data to be collected e.g., tags, data context, alarms, events, diagnostics, SOE data and configuration of data to be forwarded to a higher level. Collection of data can be from disparate sources including storage of data, retrieval of data, and management of data. Management of data collected by/residing in other data stores (e.g., higher-level business systems, 3rd party products) can be processed by the respective applications. The presentation and reporting services 720 (PRS) can supply generic, customizable services for collating and presenting data in a common plant model-defined context. This can include access to stored data, analysis/calculators and query mechanisms, and embeddable, interactive presentation components (e.g., text, charts, SPC). The service 710 can generate reports with various means of presentation/distribution (e.g., web, email) having export capabilities to standard formats (e.g., XML, Excel).

Figure 8:
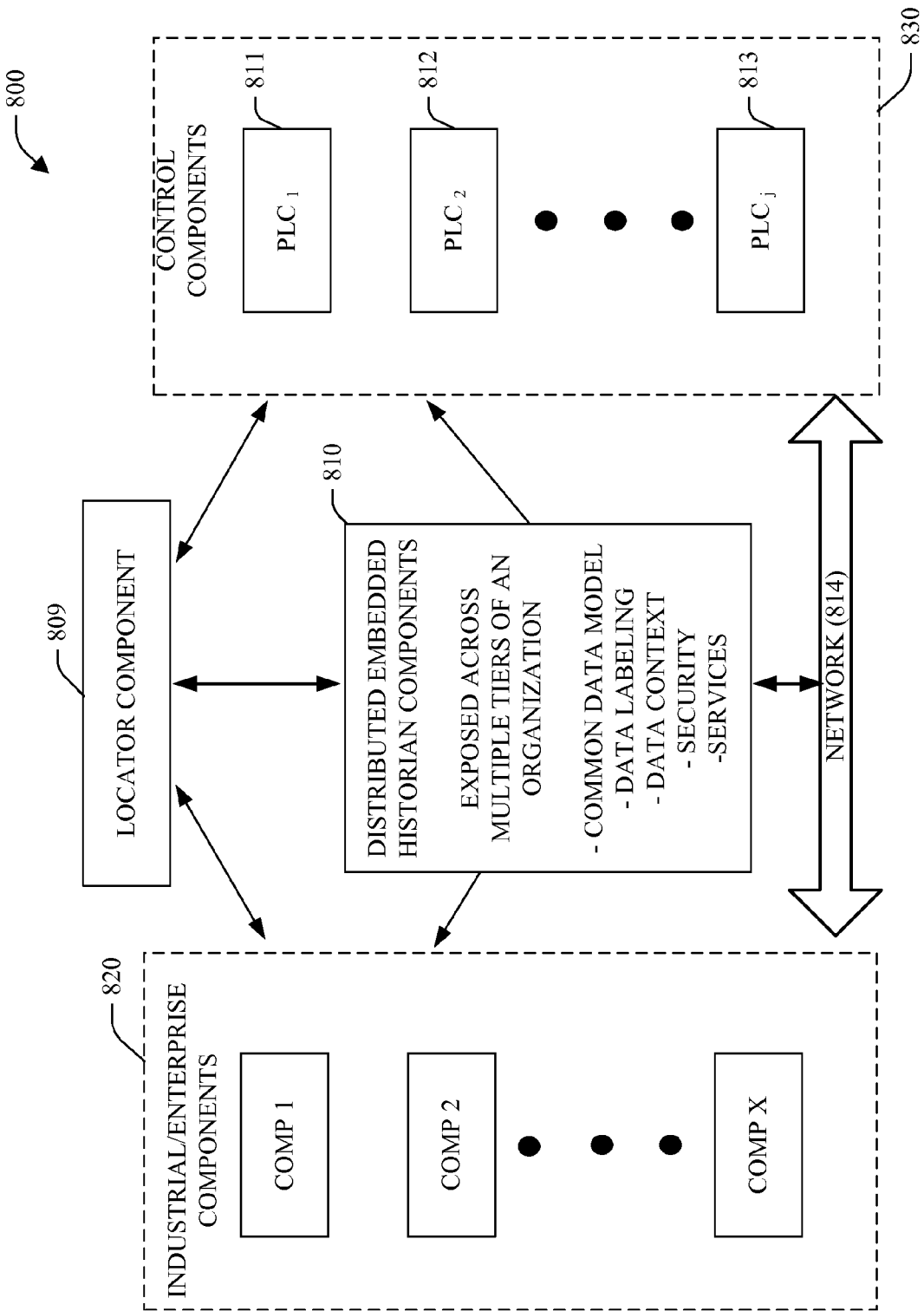
FIG. 8 illustrates a block diagram of a locator component, to identify distributed embedded historian components that are integrated as part of industrial units in accordance with an aspect of the subject innovation.

FIG. 8 illustrates a block diagram of a locator component 809, which identifies distributed embedded historian components 810 that are integrated as part of industrial units in accordance with an aspect of the subject innovation. For example, such locator component 809 can detect embedded historians that are to be configured and are distributed on the back plane of an industrial network. The locator component 809 can be part of applications running with the control components 811, 812, 813 (1 to j, where j is an integer) which can function as a management control center for the industrial network system 800. Accordingly, a distributed embedded historian framework is provided, which can be integrated as part of the industrial units, wherein historical data types can be collected based on configurations of the embedded historian, (e.g., in accordance with an organizational model of a hierarchical system that is distributed across various elements of an enterprise)—such that when a plant comes on-line, the embedded historians announce their presence to the industrial plant 800, and are discovered thereby. A directory service (not shown) can further operate with the organizational model to enable configuration of embedded historians within the organization.

A network system 814 can be associated with the industrial automation system 800, which can be searched via the locator component 809. The network system can further include additional hosts, which may be personal computers, servers or other types of computers. Such hosts generally can be capable of running or executing one or more application-level (or user-level) programs, as well as initiating an I/O request (e.g., 110 reads or writes). In addition, the network system can further include one or more input/output units (I/O units), wherein such I/O units can includes one or more I/O controllers connected thereto, and each of the I/O can be any of several types of I/O devices, such as storage devices (e.g., a hard disk drive, tape drive) or other I/O device. The hosts and I/O units and their attached I/O controllers and devices can be organized into groups such as clusters, with each cluster including one or more hosts and typically one or more I/O units (each I/O unit including one or more I/O controllers). The hosts and I/O units can be interconnected via a collection of routers, switches and communication links (such as wires, connectors, cables, and the like) that connects a set of nodes (e.g., connects a set of hosts and I/O units) of one or more clusters.

It is noted that as used in this application, terms such as "component," "hierarchy," "model," and the like are intended to refer to an electromechanical units computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components can reside within a process and/or thread of execution and a component may be localized on one computer and/or distributed between two or more computers, industrial controllers, and/or modules communicating therewith.

Figure 9:
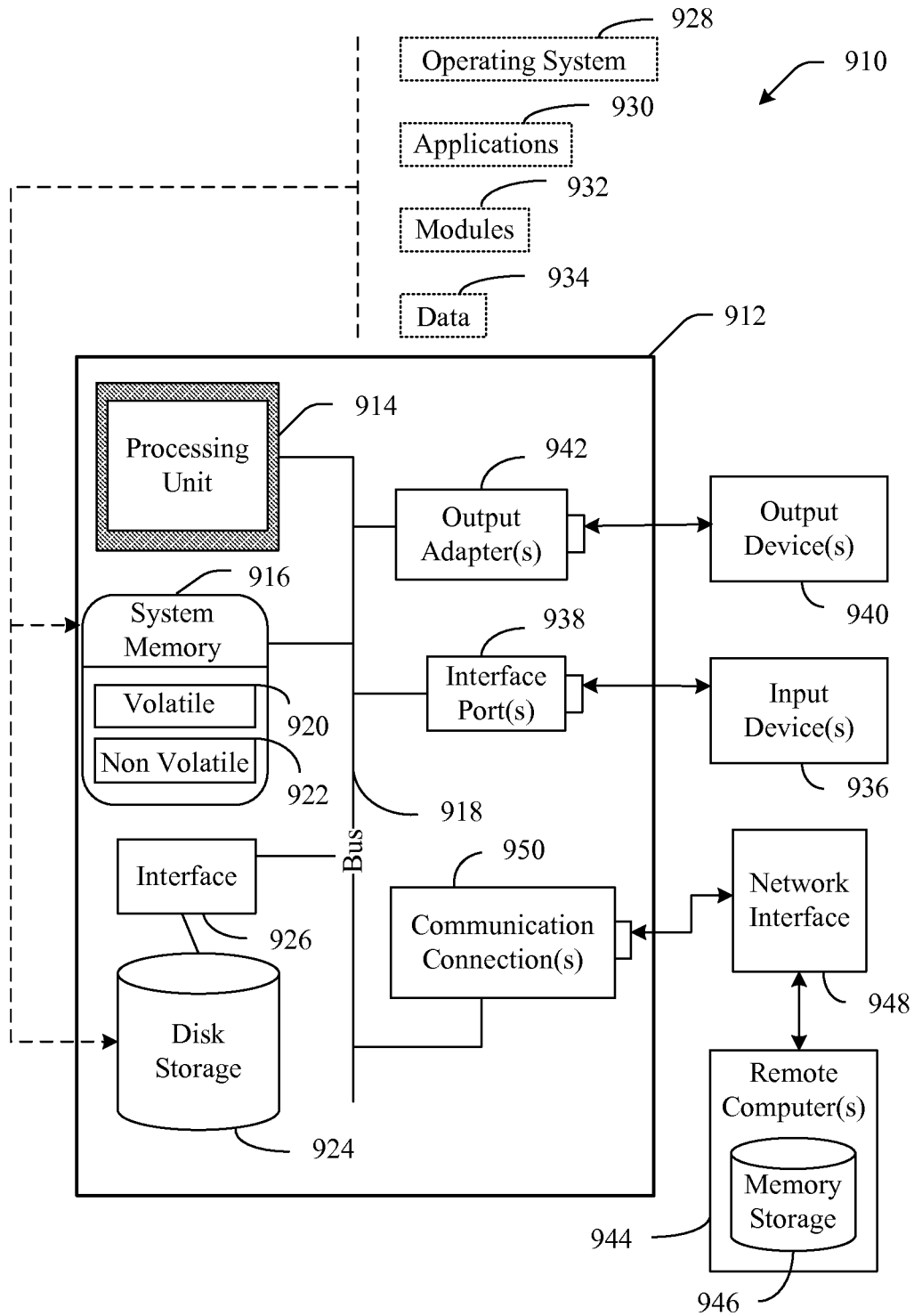
FIG. 9 illustrates an exemplary environment for implementing various aspects of the locator component to identify historians integrated as part of industrial units.

FIG. 9 illustrates an exemplary environment 910 for implementing various aspects of the locator component to identify historians integrated as part of industrial units. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914. The system bus 918 can be any of several types of bus structure(s) including the memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-60 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that various components described herein can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

As used herein, the terms "component," "system" and the like are intended to refer to a computer-related entity, either hardware, a combination of hardware and software, software, or software in execution, as well as electro mechanical components. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Figure 10:
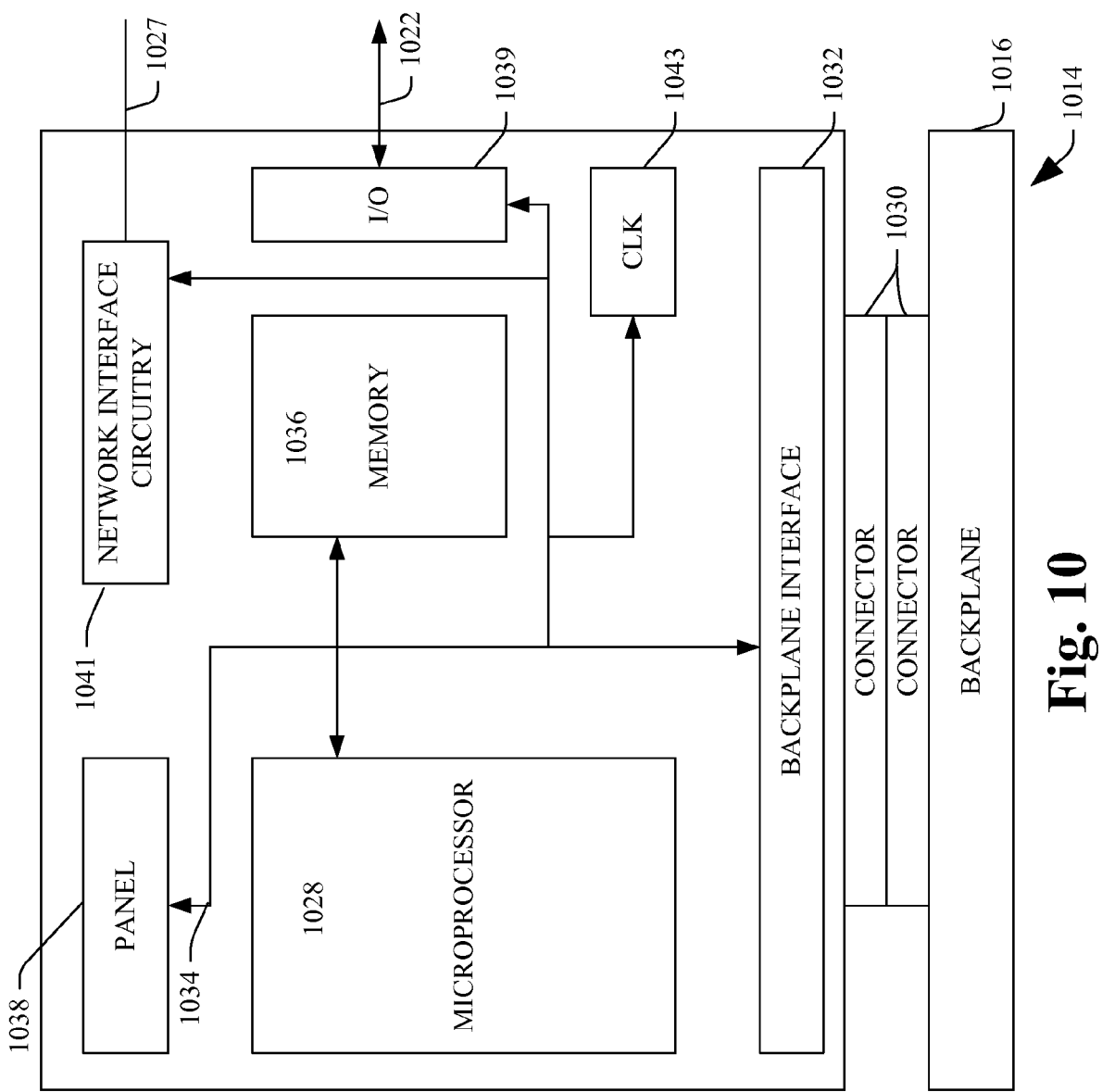
FIG. 10 illustrates an industrial setting with a backplane and associated modules in accordance with an aspect of the subject innovation.

FIG. 10 illustrates an additional environment for implementing historians that are integrated as part of industrial units, wherein each functional module 1014, is attached to the backplane 1016 by means of a separable electrical connector 1030 that permits the removal of the module 1014 from the backplane 1016—(so that it may be replaced or repaired without disturbing the other modules 1014.) The backplane 1016 provides the module 1014 with both power and a communication channel to the other modules 1014. Local communication with the other modules 1014 through the backplane 1016 is accomplished by means of a backplane interface 1032 which electrically connects the backplane 1016 through connector 1030. The backplane interface 1032 monitors messages on the backplane 1016 to identify those messages intended for the particular module 1014, based on a message address being part of the message and indicating the message destination. Messages received by the backplane interface 1032 are conveyed to an internal bus 1034 in the module 1014.

The internal bus 1034 joins the backplane interface 1032 with a memory 1036, a microprocessor 1028, front panel circuitry 1038, I/O interface circuitry 1039 and communication network interface circuitry 1041. The microprocessor 1028 can be a general purpose microprocessor providing for the sequential execution of instructions included within the memory 1036 and the reading and writing of data to and from the memory 1036 and the other devices associated with the internal bus 1034. The microprocessor 1028 includes an internal clock circuit (not shown) providing the timing of the microprocessor 1028 but may also communicate with an external clock 1043 of improved precision. This clock 1043 may be a crystal controlled oscillator or other time standard including a radio link to an external time standard. The precision of the clock 1043 may be recorded in the memory 1036 as a quality factor. The panel circuitry 1038 includes status indication lights such as are well known in the art and manually operable switches such as for locking the module 1014 in the off state.

The memory 1036 can comprise control programs or routines executed by the microprocessor 1028 to provide control functions, as well as variables and data necessary for the execution of those programs or routines. For I/O modules, the memory 1036 may also include an I/O table holding the current state of inputs and outputs received from and transmitted to the industrial controller 1010 via the I/O modules 1020. The module 1014 can be adapted to perform the various methodologies of the innovation, via hardware configuration techniques and/or by software programming techniques.

What has been described above includes various exemplary aspects. It is, of course, not possible to describe every conceivable combination of components or methodologies for purposes of describing these aspects, but one of ordinary skill in the art may recognize that many further combinations and permutations are possible. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the innovation. In this regard, it will also be recognized that the innovation includes a system as well as a computer-readable medium having computer-executable instructions for performing the acts and/or events of the various methods of the innovation. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An industrial automation system, comprising:
   a memory that stores at least one computer-executable component; and
   a processor, communicatively coupled to the memory, that facilitates execution of the at least one computer-executable component, the at least one computer-executable component, comprising:
   a historian configured to be physically integrated and uniquely associated with a manufactured product, wherein the historian is further configured to store data pertinent to manufacture of the product, and the historian further comprises a locator component configured to:
  locate at least one other historian associated with the manufacture of the product, the at least one other historian storing data pertinent to the manufacture of the product; and
  retrieve the data from the other historian for storage on the historian to facilitate a pooling of data pertinent to the manufacture of the product at the historian; and
  a visualization component, associated with the historian, configured to present the data at a plurality of granularity levels.

2. The industrial automation system of claim 1, wherein the locator component is configured to employ a directory and discover service to communicate with the at least one other historian.

3. The industrial automation system of claim 2, wherein the directory and discover service includes a network directory to facilitate at least one of determination of physical addresses from logical names or determination of logical names from physical addresses.

4. The industrial automation system of claim 1, wherein the historian further comprises a publish and subscribe component configured to facilitate, in response to a change in the data, at least one of publication or generation of the data.

5. The industrial automation system of claim 1, wherein the data is related to at least one of a process, a machine, or an aspect of machine control, pertaining to the manufacture of the product.

6. The industrial automation system of claim 1, wherein the plurality of granularity levels are associated with at least one of fault detection or alert triggering, a multi-tiered representation of an industrial process associated with the product, a requirement of an enterprise resource planning application, to facilitate an allocation of a resource, or a distribution of a resource.

7. The industrial automation system of claim 1, wherein the historian is further configured to communicate directly with at least one other historian.

8. The industrial automation system of claim 1, wherein the integrated historian is further configured to associate a visualization attribute with the data.

9. A method for utilizing a historian, integratable with a component manufactured in an industrial plant comprising:
  storing, by a system including at least one processor, data on the historian, wherein the historian is mechanically attached to the component, the component is in a first state, the data pertaining to manufacture of the component, and the manufacture includes changing the state of the component from a first state of manufacture to a second state of manufacture; and
  locating at least one other historian asscoiated with the manufacture of the product, the at least one other historian storing data pertinent to the manufacture of the product; and
  retrieving the data from the other historian for storage on the historian to facilitate a pooling of data pertinent to the manufacture of the product at the historian
  presenting the data, via a visualization component co-located with the historian, at a plurality of granularity levels.

10. The method of claim 9, further comprising: communicating, by the system, with the at least one other historian.

11. The method of claim 9, further comprising:
  determining, by the system, which data to present according to at least one of fault detection, alarms associated with the manufacture of the product, a multi-tiered representation of an industrial process associated with the product, a requirement of an enterprise resource planning application associated with the product, facilitating allocating of a resource, or distributing of a resource.

12. A non-transitory computer-readable storage medium comprising computer executable instructions that, in response to execution, cause computing system to perform operations comprising:
  identifying, from a plurality of historians, one historian uniquely associated with manufacture of a product, wherein the historian is embedded in the product and records data associated with the manufacture of the product;
  locating at least one other historian associated with the manufacture of the product, the at least one other historian storing data pertinent to the manufacture of the product;
  retrieving the data from the other historian for storage on the historian to facilitate a pooling of data pertinent to the manufacture of the product at the historian; and
  displaying the data, via a visualization component co-located with the historian, in accordance with a plurality of granularity levels.

13. The computer-readable storage medium of claim 12, wherein the identifying further comprises utilizing a directory.

14. The computer-readable storage medium of claim 13, further comprising, utilizing the directory to facilitate determining at least one of physical addresses from logical names or logical names from physical addresses for the historian.

15. The computer-readable storage medium of claim 12, wherein the displaying is a function of at least one of detecting a fault associated with the product, identifying an alarm associated with the product, a multi-tiered representation of an industrial process associated with the product, a requirement of an enterprise resource planning application associated with the product, facilitating allocating of a resource, or distributing of a resource.

16. The industrial system of claim 1, wherein the visualization component, in association with presentation of the data at a plurality of granularity levels, facilitates collection and viewing of the data in response to received requests for the collection or the viewing of the data.

17. The method of claim 9, wherein the presenting of the data at a plurality of granularity levels facilitates collection and viewing of the data in response to received requests for the collection or the viewing of the data.

18. The computer-readable storage medium of claim 12, wherein the displaying of the data is performed in response to received requests for the storing or the displaying of the data.

19. The industrial system of claim 1, wherein the historian is further configured to determine an amount of the data to be stored by the historian from a control device associated with the manufacture of the product, wherein the volume is a function of a definition of the control device in a hierarchical data model.

20. The industrial system of claim 19, wherein the hierarchical data model facilitates determination of a location level of the control device in an industrial plant operation associated with the manufacture of the product, wherein a first criticality of the data at a first level is different than a second criticality of data at a second level of the hierarchical data model.

* * * * *